US012579538B2

(12) United States Patent
Law et al.

(10) Patent No.: US 12,579,538 B2
(45) Date of Patent: Mar. 17, 2026

(54) USER DEVICE GATED AUTHENTICATION AND TOKENIZATION COMPUTING SYSTEMS AND METHODS

(71) Applicant: Login ID Inc., San Mateo, CA (US)

(72) Inventors: Simon Law, San Mateo, CA (US);
Peter Thien Duong, Mississauga (CA)

(73) Assignee: Login ID Inc., San Mateo, CA (US)

( * ) Notice: Subject to any disclaimer, the term of this patent is extended or adjusted under 35 U.S.C. 154(b) by 24 days.

(21) Appl. No.: 18/648,295

(22) Filed: Apr. 26, 2024

(65) Prior Publication Data

US 2024/0362622 A1      Oct. 31, 2024

Related U.S. Application Data

(60) Provisional application No. 63/464,907, filed on May 8, 2023, provisional application No. 63/462,514, filed on Apr. 27, 2023.

(51) Int. Cl.
| | |
|---|---|
| *G06Q 20/36* | (2012.01) |
| *G06Q 20/34* | (2012.01) |
| *G06Q 20/38* | (2012.01) |
| *H04L 9/32* | (2006.01) |

(52) U.S. Cl.
CPC ......... *G06Q 20/367* (2013.01); *G06Q 20/351* (2013.01); *G06Q 20/3674* (2013.01); *G06Q 20/3825* (2013.01); *G06Q 20/3829* (2013.01); *G06Q 20/385* (2013.01); *H04L 9/3247* (2013.01); *H04L 9/3271* (2013.01)

(58) Field of Classification Search
CPC ............... G06Q 20/367; G06Q 20/351; G06Q 20/3674; G06Q 20/3825; G06Q 20/3829; G06Q 20/385; G06Q 20/363; H04L 9/3247; H04L 9/3271

USPC ........................................................... 705/65
See application file for complete search history.

(56) References Cited

U.S. PATENT DOCUMENTS

| | | | | |
|---|---|---|---|---|
| 2024/0362599 A1* | 10/2024 | Jain | ...................... | G06Q 20/108 |
| 2024/0386418 A1* | 11/2024 | Chen | .................. | G06Q 20/3674 |

OTHER PUBLICATIONS

Pandy et al. "Multi-Faceted Evolution of Mobile Payment Strategy, Authentication and Technology", Oct. 30, 2017, 12 pages (Year: 2017).*

* cited by examiner

*Primary Examiner* — James D Nigh
(74) *Attorney, Agent, or Firm* — FOLEY & LARDNER LLP

(57) ABSTRACT

Systems and methods are provided that allows users to execute a secure transaction that is authenticated by their digital wallet on their user device. A device-bound digital wallet authentication process includes first registering data with a user device, a network tokenization server, a card issuer server, a digital coordination and notification (DCN) server, and an access control server. The data includes a network-device token and an alias of a primary account number that are stored on the user device, the network tokenization server, and the card issuer server. The data also includes a notification token, a signing public key and the alias that are stored on the DCN server and the access control server. In the device-bound digital wallet authentication, the alias and the network-device token are used to securely authenticate the user device and transaction information associated with the digital wallet that is bound to the user device.

17 Claims, 8 Drawing Sheets

300

NETWORK INTERFACE

MEMORY

PROCESSOR

I/O DEVICE

301

302

303

304

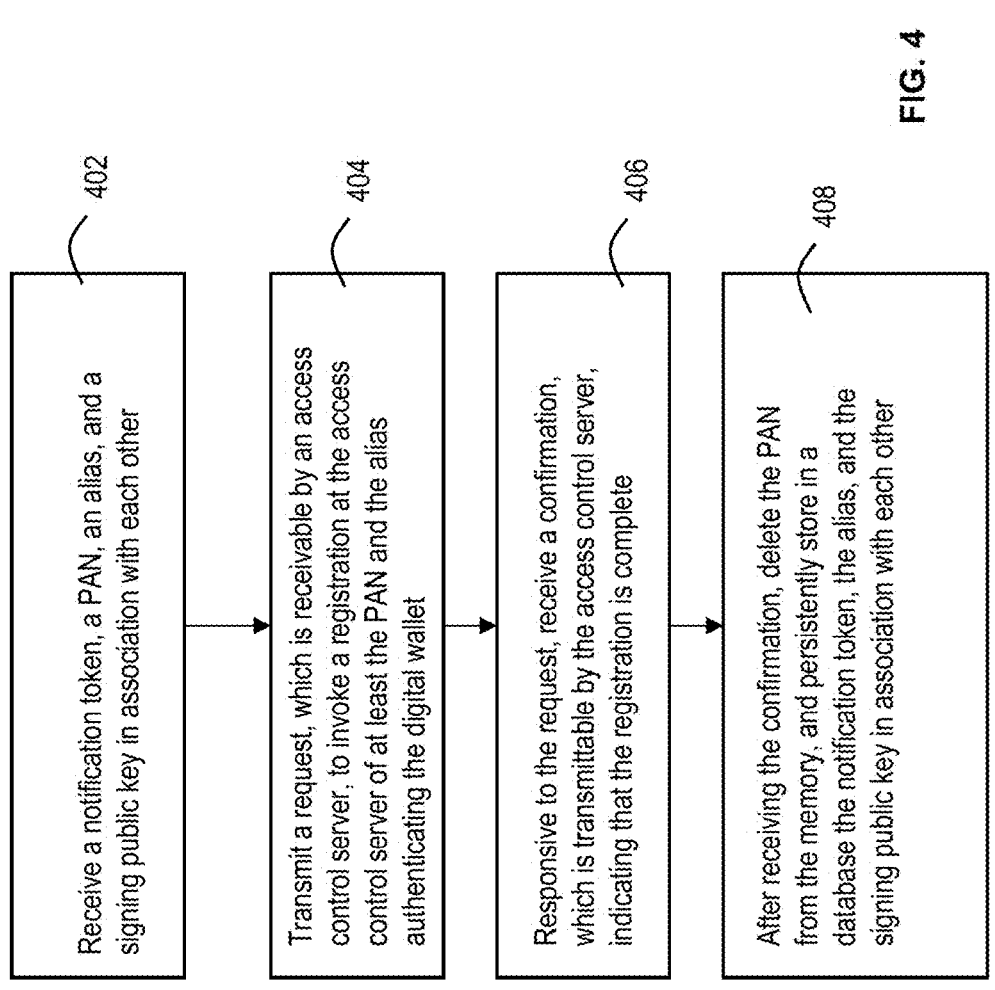

400

402

Receive a notification token, a PAN, an alias, and a signing public key in association with each other

404

Transmit a request, which is receivable by an access control server, to invoke a registration at the access control server of at least the PAN and the alias authenticating the digital wallet

406

Responsive to the request, receive a confirmation, which is transmittable by the access control server, indicating that the registration is complete

408

After receiving the confirmation, delete the PAN from the memory, and persistently store in a database the notification token, the alias, and the signing public key in association with each other

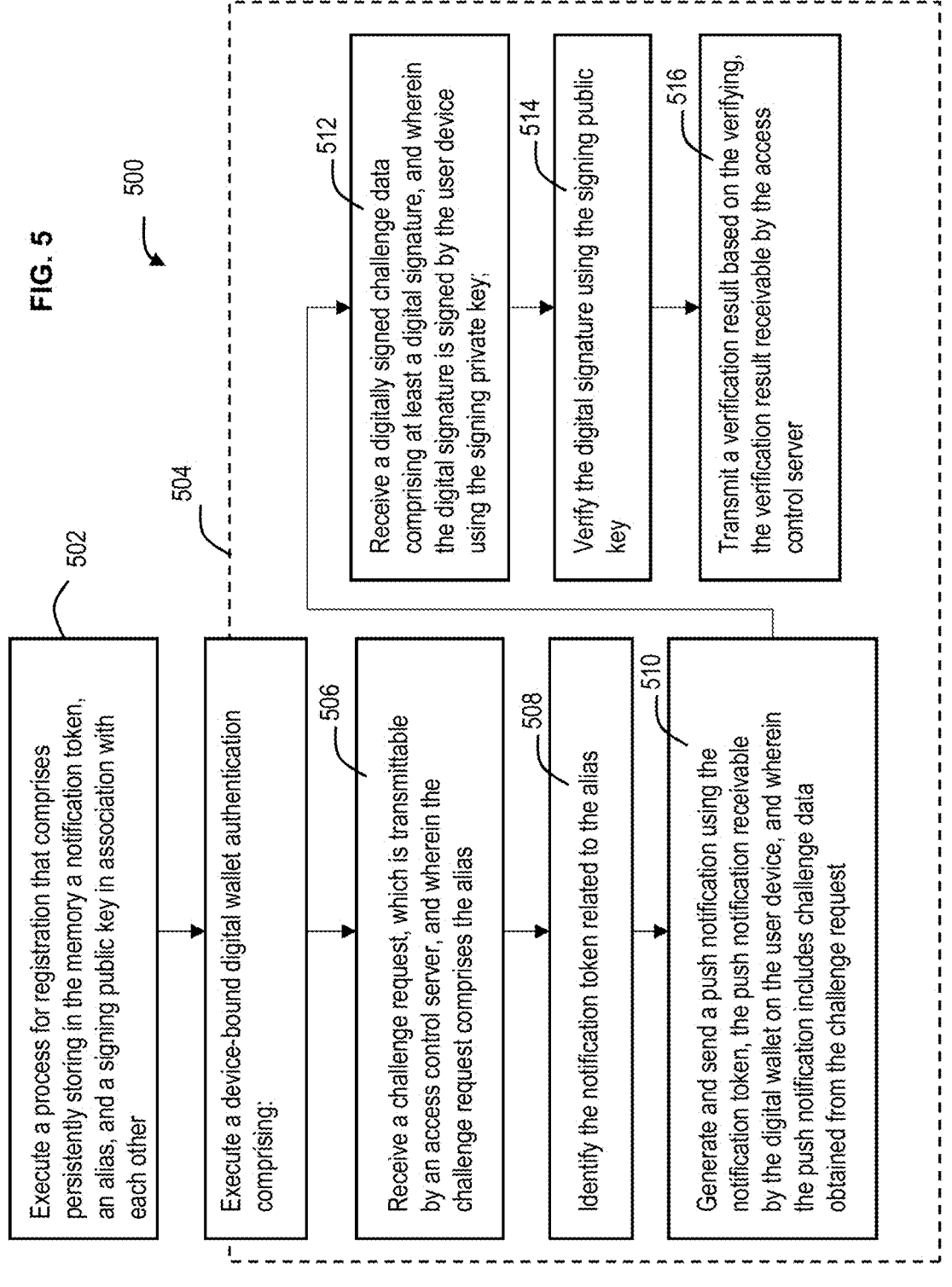

500

502 Execute a process for registration that comprises persistently storing in the memory a notification token, an alias, and a signing public key in association with each other 504 Execute a device-bound digital wallet authentication comprising:

506 Receive a challenge request, which is transmittable by an access control server, and wherein the challenge request comprises the alias 508 Identify the notification token related to the alias 510 Generate and send a push notification using the notification token, the push notification receivable by the digital wallet on the user device, and wherein the push notification includes challenge data obtained from the challenge request 512 Receive a digitally signed challenge data comprising at least a digital signature, and wherein the digital signature is signed by the user device using the signing private key;

514 Verify the digital signature using the signing public key

516 Transmit a verification result based on the verifying, the verification result receivable by the access control server 600a After a process for registration between at least the user device and the DCN server:

602

The user device persistently stores in the digital wallet at least a network-device token, an alias, and a notification token; wherein the notification token is a unique iD of the digital wallet that is bound to the user device, wherein the alias is linked to a PAN that is associated with the digital credit card stored in the digital wallet

604

The hardware-backed device authenticator of the user device stores a signing public key and a signing private key in association with the digital wallet and the alias

606

The DCN server persistently stores the notification token, the alias, and the signing public key in association with each other

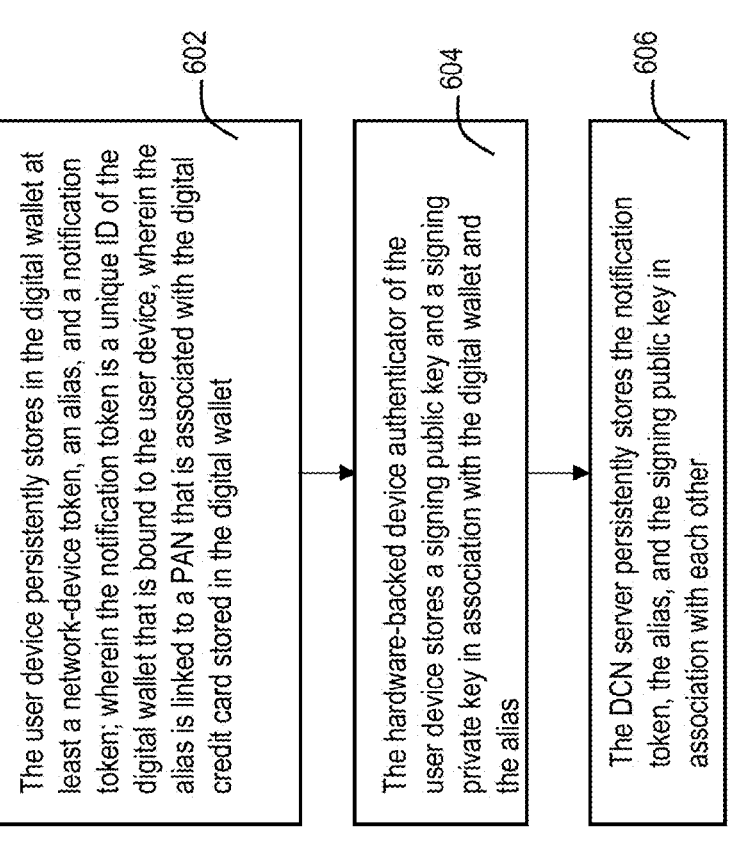

FIG. 6A

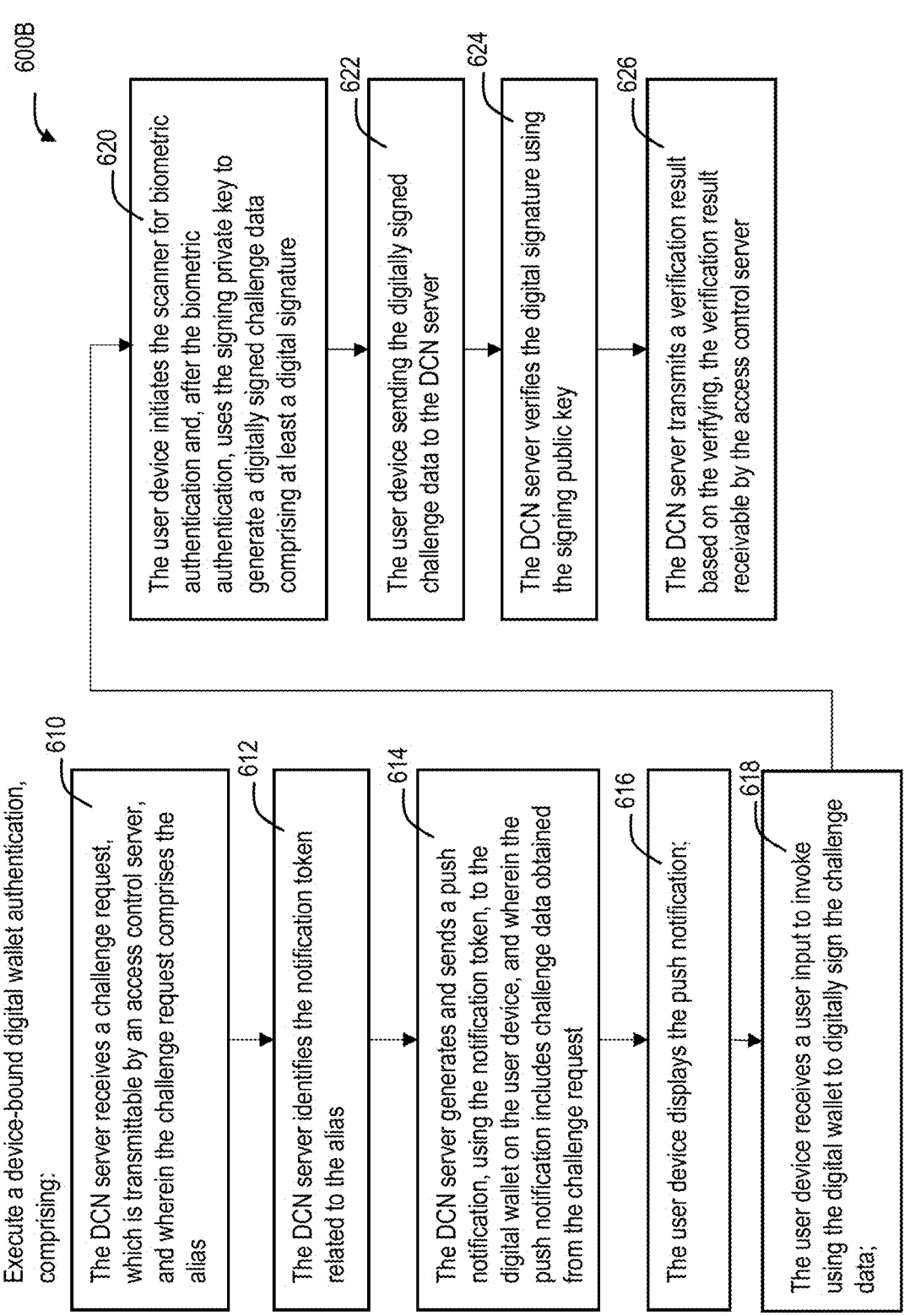

600B

Execute a device-bound digital wallet authentication, comprising:

610 — The DCN server receives a challenge request, which is transmittable by an access control server, and wherein the challenge request comprises the alias 612 — The DCN server identifies the notification token related to the alias 614 — The DCN server generates and sends a push notification, using the notification token, to the digital wallet on the user device, and wherein the push notification includes challenge data obtained from the challenge request 616 — The user device displays the push notification;

618 — The user device receives a user input to invoke using the digital wallet to digitally sign the challenge data;

620 — The user device initiates the scanner for biometric authentication and, after the biometric authentication, uses the signing private key to generate a digitally signed challenge data comprising at least a digital signature 622 — The user device sending the digitally signed challenge data to the DCN server 624 — The DCN server verifies the digital signature using the signing public key 626 — The DCN server transmits a verification result based on the verifying, the verification result receivable by the access control server

FIG. 6B

USER DEVICE GATED AUTHENTICATION AND TOKENIZATION COMPUTING SYSTEMS AND METHODS

CROSS-REFERENCE TO RELATED APPLICATIONS

This patent application claims priority to United States Provisional Application No. 63/462,514 filed on Apr. 27, 2023 and titled "User Device Gated Authentication And Tokenization Computing Systems And Methods", and to United States Provisional Application No. 63/464,907 filed on May 8, 2023 and titled "User Device Gated Authentication And Tokenization Computing Systems And Methods", the entire contents of which are hereby incorporated by reference.

TECHNICAL FIELD

The following generally relates to secure authentication computing systems and methods that are gated by a user device, and that utilize tokenization.

DESCRIPTION OF THE RELATED ART

People interact with computing platforms over the Internet to perform actions, such as transactions. These actions include authenticating a person using their credentials, confirming information, and receiving authorization for the transaction. Entities involved in the transaction, such as a payment network, a merchant, and the user need to verify that the information is correct. A payment network and a merchant also need to verify that transaction is authorized by the user, and not from an adversary (e.g., a fraudulent actor). Conversely, the user needs to also verify that intent of the transaction, as well as the accuracy of the information related to the transaction.

SUMMARY

The following summary is intended to introduce the reader to various aspects of the detailed description, but not to define or delimit any invention.

In at least one broad aspect, a data coordination and notification (DCN) server system is provided, comprising: a memory, a network interface, and a processor operatively coupled to the memory and the network interface. The processor is configured to execute a registration process comprising: receiving a notification token, a primary account number (PAN), an alias, and a signing public key in association with each other, wherein the notification token is a unique ID of a digital wallet of a user device, wherein the alias is linked to the PAN that is associated with a digital credit card stored in the digital wallet, and wherein the signing public key corresponds to a signing private key generated by the user device in association with the digital wallet; transmitting a request, which is receivable by an access control server, to invoke a registration at the access control server of at least the PAN and the alias authenticating the digital wallet; responsive to the request, receiving a confirmation, which is transmittable by the access control server, indicating that the registration is complete; and after receiving the confirmation, deleting the PAN from the memory, and persistently storing in a database the notification token, the alias, and the signing public key in association with each other.

In some cases, the data coordination and notification server system is in data communication with the user device, and the notification token, the PAN, the alias, and the signing public key are sent by the user device.

In some cases, the DCN server system further persistently stores in the database one or more Access Control Server (ACS) handlers in association with at least the alias and the notification token, and wherein the one or more ACS handlers each comprises information that facilitates communication between the data coordination and notification server system and the access control server.

In some cases, the DCN server system further persistently stores in the database user device information about the user device 100 in association with at least the alias and the notification token, and wherein the user device information comprises: a device build/model, or an operating system (OS) version, or a device name, or a combination thereof.

In some cases, the DCN server system further persistently stores in the database a wallet ID in association with at least the alias and the notification token, wherein the wallet ID uniquely identifies the digital wallet.

In some cases, the DCN server system further persistently stores in the database an enrollment state in association with at least the alias and the notification token, wherein the enrollment state is a state identifying whether or not the digital credit card is enrolled with the data coordination and notification server system.

In some cases, the DCN server system further persistently stores in the database a state machine, which tracks and stores a plurality of states of a plurality of digital wallets in a plurality of user devices, and which ones of a plurality of digital credit cards are stored in or associated with which ones of the plurality of digital wallets; and, at least one state in the state machine is associated with the notification token, the alias, and the signing public key.

In some cases, the alias alone cannot be used to compute the network-device token nor the PAN.

In some cases, the alias is a payment account reference (PAR) or a PanRefID, or a TokenRefID.

In some cases, the processor is further configured to, after the registration process, execute a device-bound digital wallet authentication comprising: receiving a challenge request, which is transmittable by the access control server, and wherein the challenge request comprises the alias; identifying the notification token related to the alias; and generating and send a push notification using the notification token, the push notification receivable by the digital wallet on the user device, and wherein the push notification includes challenge data obtained from the challenge request.

In some cases, the push notification invokes a pop-up notification in the user device.

In some cases, the device-bound digital wallet authentication further comprises: responsive to sending the push notification, receiving a digitally signed challenge data comprising at least a digital signature, and wherein the digital signature is signed by the user device using the signing private key; verifying the digital signature using the signing public key; and transmitting a verification result based on the verifying, the verification result receivable by the access control server.

In at least another broad aspect, a data coordination and notification server system, comprises: a memory, a network interface, and a processor operatively coupled to the memory and the network interface. The processor is configured to execute a registration process that comprises persistently storing a notification token, an alias, and a signing public key in association with each other, wherein the notification token is a unique ID of a digital wallet of a user device, wherein the alias is linked to the PAN that is associated with a digital credit card stored in the digital wallet, and wherein the signing public key corresponds to a signing private key generated by the user device in association with the digital wallet. The processor further configured to execute a device-bound digital wallet authentication comprising: receiving a challenge request, which is transmittable by an access control server, and wherein the challenge request comprises the alias; identifying the notification token related to the alias; and generating and sending a push notification using the notification token, the push notification receivable by the digital wallet on the user device, and wherein the push notification includes challenge data obtained from the challenge request.

In some cases, the push notification invokes a pop-up notification in the user device.

In some cases, the device-bound digital wallet authentication further comprises: responsive to sending the push notification, receiving a digitally signed challenge data comprising at least a digital signature, and wherein the digital signature is signed by the user device using the signing private key; verifying the digital signature using the signing public key; and transmitting a verification result based on the verifying, the verification result receivable by the access control server.

In some cases, the registration process further comprises persistently storing one or more Access Control Server (ACS) handlers in association with at least the alias and the notification token, and wherein the one or more ACS handlers each comprises information that facilitates communication between the data coordination and notification server system and the access control server.

In some cases, the registration process further comprises persistently storing user device information about the user device in association with at least the alias and the notification token, and wherein the user device information comprises: a device build/model, or an operating system (OS) version, or a device name, or a combination thereof.

In some cases, the registration process further comprises persistently storing an enrollment state in association with at least the alias and the notification token, wherein the enrollment state is a state identifying whether or not the digital credit card is enrolled with the data coordination and notification server system.

In some cases, the registration process further comprises persistently storing a state machine, which tracks and stores a plurality of states of a plurality of digital wallets in a plurality of user devices, and which ones of a plurality of digital credit cards are stored in or associated with which ones of the plurality of digital wallets; and, at least one state in the state machine is associated with the notification token, the alias, and the signing public key.

In at least another broad aspect, a system for device-bound digital wallet authentication is provided, comprising: a user device and a digital coordination and notification (DCN) server. The user device comprises a hardware-backed device authenticator, a scanner, and a memory storing thereon a digital wallet.

In some cases, after a registration process between at least the user device and the DCN server, the user device persistently stores in the digital wallet at least a network-device token, an alias, and a notification token; wherein the notification token is a unique ID of the digital wallet that is bound to the user device, wherein the alias is linked to a primary account number (PAN) that is associated with the digital credit card stored in the digital wallet. The hardware-backed device authenticator stores a signing public key and a signing private key in association with the digital wallet and the alias. The DCN server persistently stores the notification token, the alias, and the signing public key in association with each other.

In some cases, the user device and the DCN server are configured to execute a device-bound digital wallet authentication comprising: the DCN server receiving a challenge request, which is transmittable by an access control server, and wherein the challenge request comprises the alias; the DCN server identifying the notification token related to the alias; the DCN server generating and sending a push notification, using the notification token, to the digital wallet on the user device, and wherein the push notification includes challenge data obtained from the challenge request; the user device displaying the push notification; the user device receiving a user input to invoke using the digital wallet to digitally sign the challenge data; the user device initiating the scanner for biometric authentication and, after the biometric authentication, using the signing private key to generate a digitally signed challenge data comprising at least a digital signature; the user device sending the digitally signed challenge data to the DCN server; the DCN server verifying the digital signature using the signing public key; and the DCN server transmitting a verification result based on the verifying, the verification result receivable by the access control server.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

Embodiments will now be described by way of example only with reference to the appended drawings wherein:

FIG. 4 is a flow diagram of computer executable or processor implemented instructions executed by a data coordination and notification server system for a process for registration.

FIG. 5 is a flow diagram of computer executable or processor implemented instructions executed by a data coordination and notification server system for a process for registration and a device-bound digital wallet authentication.

FIGS. 6A and 6B is a flow diagram of computer executable or processor implemented instructions executed by a data coordination and notification server system and a user device for storing data after a process for registration and for a device-bound digital wallet authentication.

DETAILED DESCRIPTION

Figure 1A:
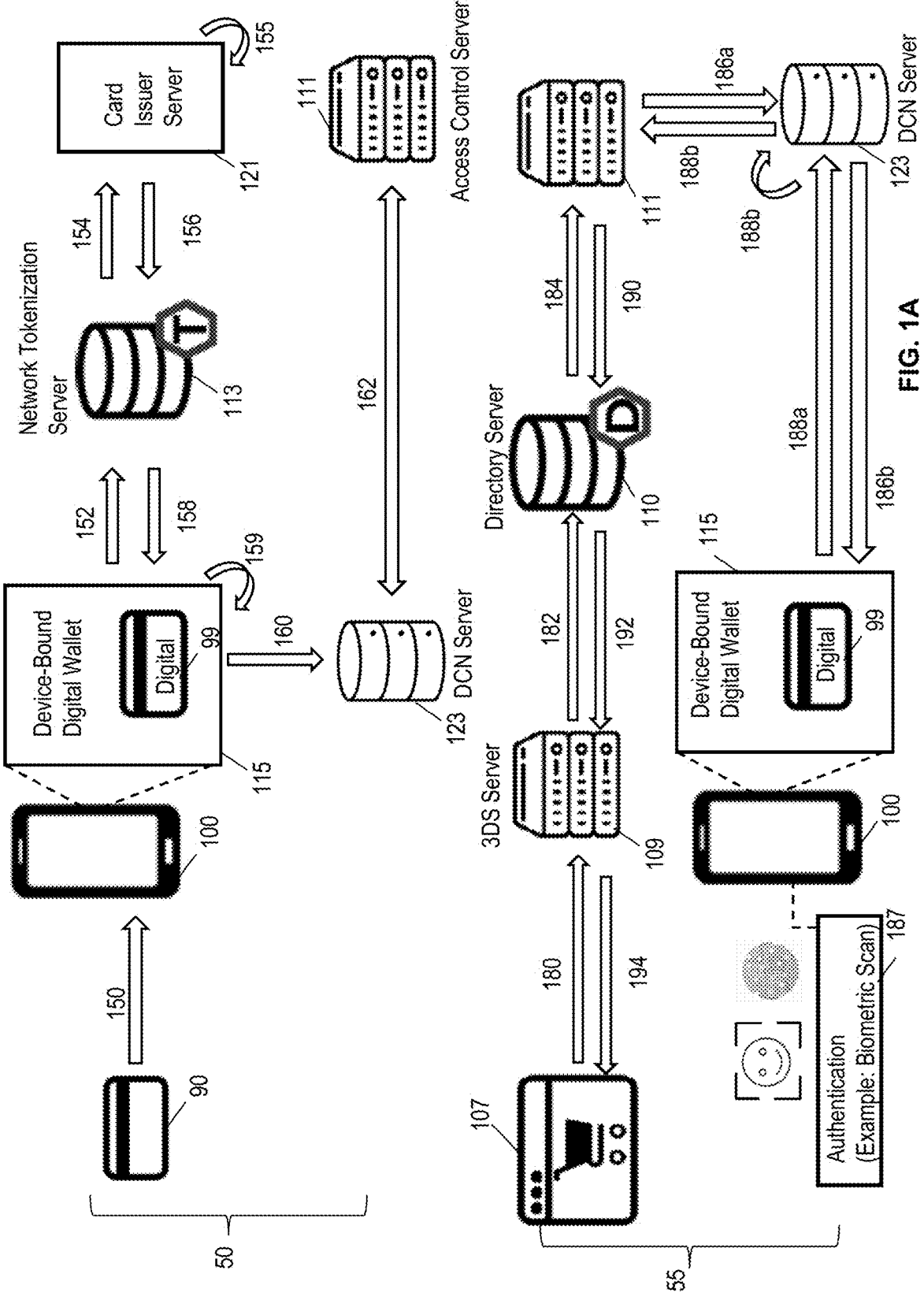
FIG. 1A is a flow diagram of computer executable or processor implemented instructions for authenticating a user device and verifying a transaction based on tokenization and interacting with an authentication network, according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

It is herein recognized that, in some cases, existing payment networks and transaction computing systems do not provide sufficient user authentication. In particular, fraud in credit card transactions is rampant. Bad actors use stolen credit card numbers, stolen user information (e.g., name, address, etc.) to make fraudulent payments. Using existing system, this relatively easy to steal information can be used to make transactions. Furthermore, bad actors can easily provide intent to make a transaction, such as by simply providing this stolen data and hitting a payment button.

It is also herein recognized that, in some cases, the transaction computing system is disjointed. This leads to merchants and users getting into disputes about amounts and transaction details.

It is also recognized that, in some cases, online stores (e.g., merchant computing servers accessible by Internet) currently utilize user passwords to help authenticate a user for a transaction. However, passwords are not effective as they can be stolen. Furthermore, many different password accounts can use different payment credentials, so there is no strong link between passwords and user authentication of a transaction.

It is also recognized that, in some cases, merchants with online payment systems are provided with many different and separate online payment systems that typically each require their own platform interfaces and registrations. In other words, while a merchant may want to adopt and register their online website or their native application with different payment services, this is a difficult and cumbersome process. For a user interacting with the merchant's online webstore or native application, the user may not find their desired payment system if the merchant has not integrated that specific payment system that is desired by the user. On the other hand, if the merchant has integrated many different payment systems into their online webstore or native application, which time consuming and technically cumbersome, a user would also have a poor user experience since the user would now need to select their desired payment system amongst several different choices being presented to them.

The above problems, amongst other challenges, make it difficult to facilitate user authenticated transactions via websites, apps, user accounts, etc. in a scalable manner.

In some cases, there are digital wallets (e.g., also herein called a payment app or wallet app) that are bound to user devices (e.g., mobile devices, mobile phones, etc.), so that and that these digital wallets can make "tap" payments or "contactless" payment to Point-Of-Sale (POS) terminals using Near Field Communication (NFC). For example, a user has mobile device with a digital wallet that is linked to a credit card. The user can make a payment with a merchant's POS terminal, which has a card reader. The user holds their mobile device near the POS terminal, and information that includes the credit card information or includes an alias or proxy information, is wireless transmitted over NFC to the card reader in the POS terminal to execute the transaction. For merchants with physical stores that use POS terminals, the transition to accept payment from a user using a typical physical contactless credit card (e.g., a plastic card with a built-in chip configured to communicate with a POS terminal via NFC) to a user using a mobile device with a digital wallet has been seamless and easy.

However, it is herein recognized that, while merchants with online stores (e.g., webstores and native apps) are adapted to process online payments using credit cards, merchants in many cases have challenges interfacing with digital wallets. Digital wallet integrations into a merchant website or a merchant native app are technically cumbersome.

Devices, systems and methods are herein provided for delegating authentication to a digital wallet. This includes linking the digital wallet to a payment processing network and an authentication network. For example, MasterCard™ has its own payment processing network and VISA™ has its own payment processing network. A 3DS network is an authentication network that is performs payment authentication before executing a payment transaction on the payment processing network. The 3DS network outputs a cryptogram (e.g., a cardholder authentication verification value, also called a CAVV) that is typically generated by an access control server within the 3DS network. The cryptogram is then passed along to the payment processing network.

A digital wallet herein refers to an application that is stored and executed on a user device (e.g., a mobile device). The digital wallet is bound to user device.

Figure 1B:
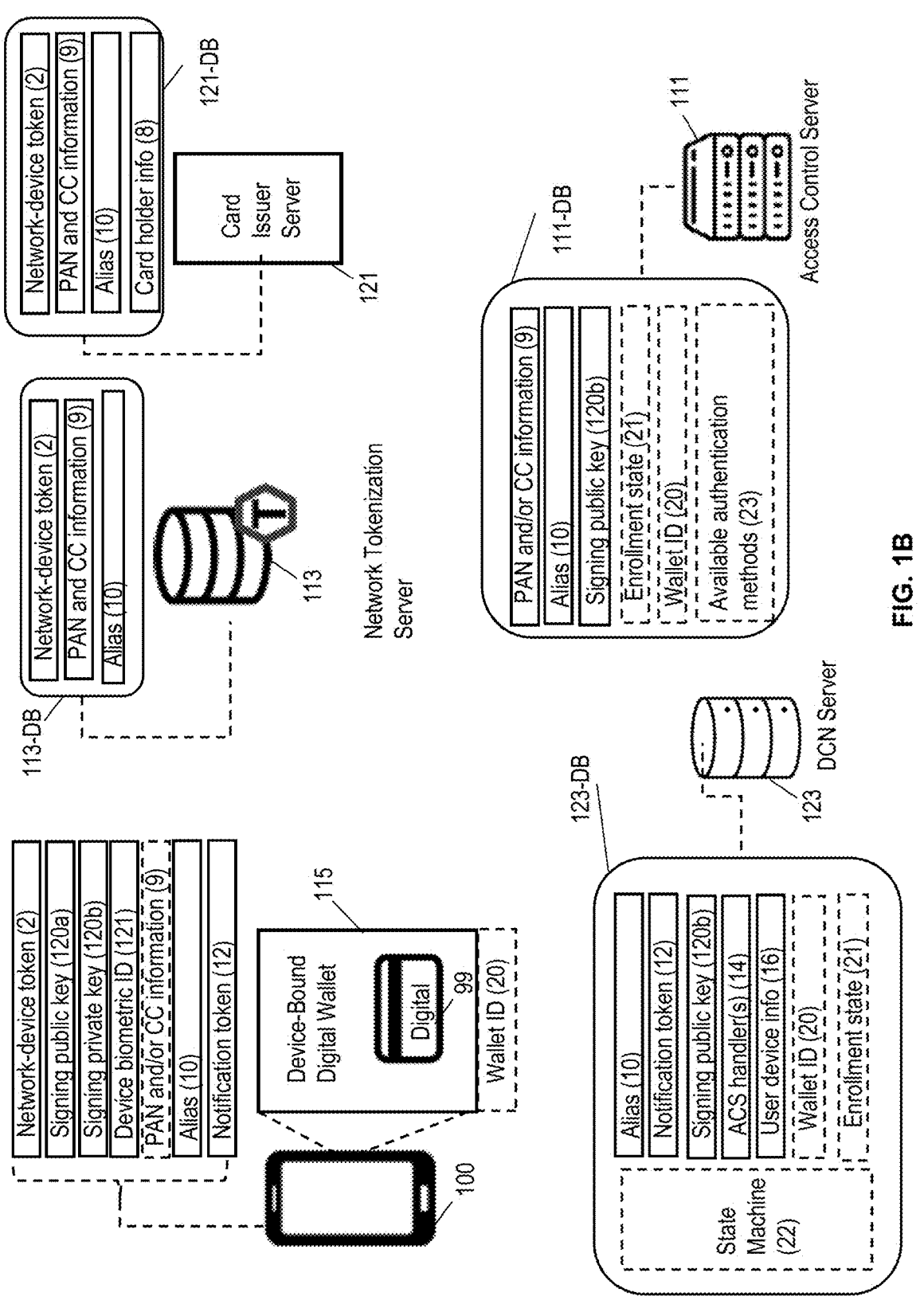
FIG. 1B is a schematic diagram of example data components stored after a registration process, according to an example embodiment.

Referring to FIG. 1A, a flow diagram illustrates a process for registration 50 and a process for a transaction 55. The operations described in FIG. 1A are executable by the user device (e.g., 100) or servers (e.g., 112, 123, 111, 107, 109, 110), or a combination thereof, shown. In some cases, there are data components that are stored during the process for registration 50, which are shown in FIG. 1B. In FIG. 1B, the data is persistently stored in databases. For example, there is a database 113-DB in the network tokenization server 113; there is a database 121-DB in the card issuer server 121; there is a database 123-DB in the data coordination and notification (DCN) server 123; and there is a database 111-DB in the access control server (ACS) 111. The following discussion refers to FIGS. 1A and 1B.

In the process for registration 50, there is a typical physical credit card 90 or a digital credit card issued by a credit card issuer 121. Information about the credit card 90, also herein called "credit card information", includes a primary account number (PAN), also called a credit card number, a name of the cardholder, an expiration date, and a Card Verification Value (CVV) or security code.

At operation 150, the credit card information 9 is inputted into a digital wallet 115 on a user device 100 (e.g., a mobile device or mobile phone). For example, a user operates the user device 100 to input the credit card information 9. At operation 152, the credit card information and information about the user device is transmitted to a network tokenization server 113. For example, an authentication network would include this server 113. At operation 154, the network tokenization server 113 transmits the credit card information to a card issuer server 121. The card issuer server 121 verifies that the information matches its existing records. In some cases, the card issuer server 121 is a bank or other entity that has issued the credit card 90 to the user. At operation 156, the card issuer server 121 transmits a message that indicates the credit card information has been verified. The network tokenization server 113 then uses this information to generate a new network-device token 2 or to authenticate an existing network-device token. The network-device token 2 is unique to a given user device and is associated with a PAN. In some cases, the network-device token 2 is called a payment token. The network-device token 2 is used by servers in the payment network to verify a requested action (e.g., a transaction).

It will be appreciated that, in some cases, one PAN can be associated with multiple network-device tokens (e.g., network-device token1, network-device token2, network-device token3) that in turn are respectively linked to their own devices (e.g., user device1, user device2, user device3). For example, a user owns a given credit card associated with a given PAN and other related credit card information, and owns a first device that has stored on it a first instance of a digital wallet (which is bound to the first device) and a second device that has stored on it a second instance of the digital wallet (which is bound to the second device). In this context, in some cases, a first network-device token is associated with the first instance of the digital wallet of the first device, a second network-device token is associated with the second instance of the digital wallet of the second device, and the first network-device token and the second network-device token are both associated with the given PAN and other related credit card information.

At operation 158, the authenticated network-device token 2 is transmitted to the user device 100. The user device 100 then stores the authenticated token in its memory, for example, in a hardware security module (HSM) or a secure enclave.

In some cases, the network-device token is used to create a digital credit card 99 within the digital wallet 115. In some cases, the digital credit card 99 is the counterpart to the existing credit card 90. In some cases, the digital credit card 99 uses alias information (e.g., an alias PAN, an alias name of the cardholder, an alias expiry date, an alias CVV or security code) that is linked to the credit card information 9 of the credit card 90. In some cases, the alias information is herein referred to as "alias" 10. In some cases, the alias 10 cannot be used to obtain the network-device token or the PAN. In this way, there is an added layer of security when a user uses their digital credit card 99 to make a payment. In some other cases, the alias 10 is a payment account reference (PAR) or a PanRefID, or a TokenRefID that is used in interactions with wallets and issuers. In some cases, the network tokenization server 113 creates the alias 10 and stores the alias 10 in association with the PAN and credit card information 9, and the network-device token 2.

In some cases, the network tokenization server 113 also sends the alias 10, the PAN and credit card information 9, and the network-device token 2 to the card issuer server 121 for storage, and the card issuer server 121 stores this information in association with a card holder information 8.

In some cases, the operations 150 to 158 are also called "identity and verification", and include the process of obtaining an authenticated token stored on the user device 100.

Figure 2:
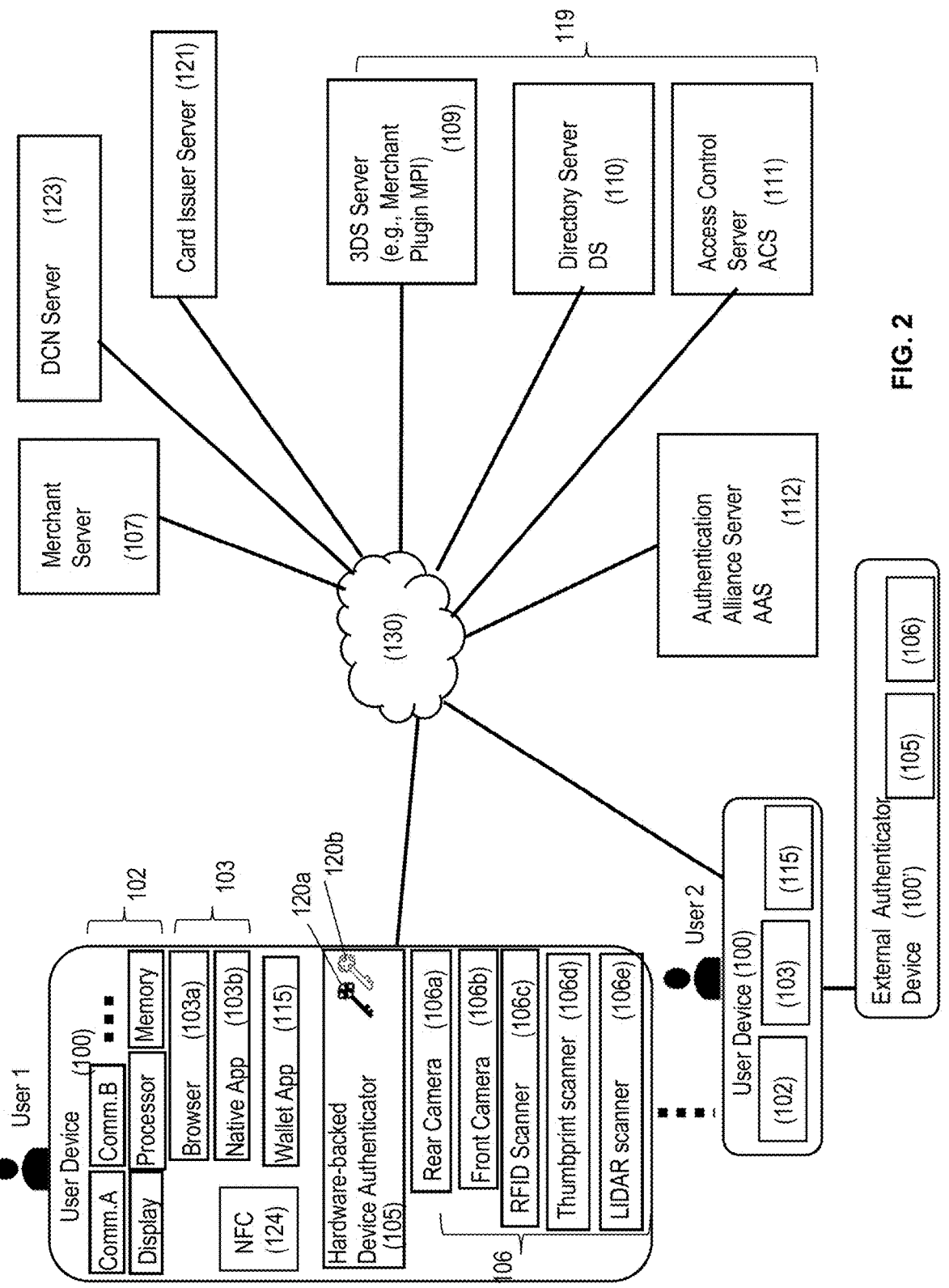
FIG. 2 is a schematic diagram of an example of a system of user devices and server systems that include, for example, a payment server, a 3DS server, a Directory server, an Access Control server and a user device with a digital wallet, according to another example embodiment.

At operation 159, after the identity and verification, the digital wallet 115 generates a signing private key 120a and a signing public key 120b (e.g., a private and public key pair) that is linked or tied to a device biometric ID 121 that is stored in a hardware-backed device authenticator on the user device 100. Referring briefly to FIG. 2, a hardware-backed device authenticator 105 (e.g., also sometimes called a hardware security module or secure enclave) is within the user device 100 and stores thereon a signing private key 120a and, in some cases, a signing public key 120b. The signing private key 120a and the signing public key 120b are used later on for signing challenge requests. In some cases, the signing private key and the signing public key are an Elliptic Curve Digital Signature Algorithm (ECDSA) key pair.

Referring back to FIGS. 1A and 1B, at operation 160, the digital wallet 115 (which operates on the user device 100) sends a notification token 12, the alias 10, and the signing public key 120b to a Device Coordination and Notification (DCN) server 123. In some cases, the DCN server 123 and the digital wallet 115 are operated by a same entity, or a same company. The notification token 12 is a unique ID to the digital wallet (i.e., a specific app) and that is also tied to the specific user device 100, and the notification token 12 is recognized by the DCN server 123 and the specific user device 100. In some cases, in which a PAN is associated with multiple instances of digital wallets stored respectively on multiple user devices, there are a corresponding set of multiple notification tokens. In some cases, the notification token 2 implicitly identifies the digital wallet 115 and the user device 100. In this way the notification token 2 can therefore act as a device identifier, as well as an application identifier (in this case the digital wallet 115).

In some cases, the digital wallet 115 is identified by a wallet ID 20.

In some cases, the PAN and/or credit card information 9 is/are not persistently stored in the memory of the user device 100. In this way, the security risk posed by the user device 100 is decreased in case a bad actor accesses the user device 100.

In some cases, as part of the process for registration 50, the DCN server 123 stores in relation to each other: the alias 10 (or in some other cases, either in addition or in alternative, a PAN and/or credit card information 9); the notification token 12; the public signing key 120b; and one or more Access Control Server (ACS) handlers 14 that belongs to the credit card (which in some cases is determined on the bin range in the PAN). In some cases, an ACS handler 14 includes information that facilitates communication between the DCN server 123 and the ACS 111.

In some other cases, the DCN server 123 additionally stores user device information 16 about the user device 100 in relation to the above noted information (e.g., alias 10, notification token 12, signing public key 120b, and ACS handler 14). In some cases, the user device information 16 includes any one or combination of: device build/model, operating system (OS) version, and device name.

In some cases, the DCN server 123 additionally stores the wallet ID 20 in association with the alias 10, the notification token 12, the signing public key 120b, and other related information.

In some cases, the DCN server 123 also stores thereon an enrollment state 21 in association with the alias 10, the notification token 12, the signing public key 120b, and other related information. In some cases, the enrollment state 21 is the state about whether or not the digital card 99 is enrolled with the DCN server 123.

In some cases, the DCN server 123 also stores thereon a state machine 22, which tracks and stores the states of all digital wallets in all user devices, and which digital credit cards are stored in or associated with which digital wallets. In some cases, the states from the state machine 22 are also linked to the respective instances of the alias 10, the notification 12, the signing public key 120b, the ACS handler(s) 14 and other related information stored in the DCN server 123.

In some cases, a user owns a first user device (e.g., a mobile phone) and a second user device (e.g., a tablet or some other device). In some cases within a transaction process, this user device information is used by the DCN server 123 for prioritizing sending a push notification to the first user device first, and secondly to the second user device. In some cases, the device information is displayed in a message on a merchant website or a merchant application, and the message that includes the device information is displayed in an iFrame provided by the ACS 111. In some cases, the message states that a notification has been sent to your mobile device followed by the device build/model, or the operating system (OS) version, or the device name, or a combination thereof. In some cases, the message is shown in the iFrame so that the merchant server does not access or handle this device information.

In some other cases, the DCN server 123 additional stores other types of information.

At operation 162, a registration process is executed between the DCN server 123 and the ACS 111, using the one or more ACS handlers 14 stored on the DCN server. The ACS 111 is an entity within the payment processing network 119. The registration process includes the DCN server 123 transmitting a request to the ACS 111 to register the PAN and/or credit card information 9 and the alias 10 for digital wallet authentication. In some cases, the request includes the PAN and/or credit card information 9 and the alias 10. The DCN server 123 obtains the PAN from the digital wallet 115 and sends the PAN to the ACS 111. However, in some cases, the DCN server 123 does not store the PAN, but the alias 10 is stored in the DCN server 123. In some cases, the PAN and/or other credit card information is purposely not persistently stored on the DCN server 123 to reduce the security risk associated with the DCN server 123. In some cases, therefore, after the process for registration 50 is complete, the PAN and/or credit card information 9 is not stored on the user device 1000 and nor on the DCN server 123.

The ACS 111 verifies the PAN and/or credit card information 9 and the alias 10 and, in some cases, verifies that the PAN is owned by the account holder (user) and belongs to the card issuer server 121. After successful verification, the ACS 11 stores this information. After verification, the ACS 111 is configured to communicate to the digital wallet 115 via the DCN server 123 for future payment actions. In some cases, the DCN server 123 and ACS 111 establish that the PAN 9 and/or alias 10 is linked to this particular digital wallet 115 on this specific device 100 for future payment requests. Optionally, the ACS 111 transmits a registration confirmation message (e.g., a confirmation response that is responsive to the request) to the DCN server 123.

In some cases, the signing public key 120b is stored in the ACS 111 in association with the PAN and/or other credit card information 9, and/or alias 10. In some cases, the ACS uses the signing public key to verify the digital signatures that originate from the device. (Alternatively, the ACS does not need to the signing public key, since the DCN server would verify digital using the signing public key and the ACS trusts the DCN.)

It will be appreciated that, by registering the credit card information (e.g., PAN and/or alias) with the ACS 111 of the payment processing network, the digital wallet is now delegated to authenticate payments directly with the payment processing network.

In some cases, the DCN server 123 also sends to the ACS 11 the wallet ID and the enrollment state 21, and the ACS 111 stores the same in association with the PAN and/or credit card information 9, and the alias 10.

In some cases, the ACS 111 also stores thereon, in association with the PAN and/or credit card information 9 and the alias 10, a list of one or more available authentication methods 23 for authenticating the PAN and/or credit card information 9. For example, the list of one or more available authentication methods 23 includes the presently described method, herein called device-bound digital wallet authentication. In some other cases, other methods in the list 23 include: One-time password (OTP) authentication, or knowledge-based authentication (KBA), or issuer-app authentication, or a combination thereof.

A process for a transaction 55 is shown using the digital wallet 115. The process for a transaction 55 is also herein called "device-bound digital wallet authentication".

A user can use a same user device 100 or a different user device (like a second mobile device or a desktop computer) to access an online webstore of a merchant server 107. In some other cases, the user device 100, or the different user device, accesses a native application that includes a digital storefront and payment processing of the merchant server 107.

The user executes a transaction with the merchant server 107. For example, the user provides their credit card information associated with their credit card 90 to the merchant server. Alternatively, the merchant server 107 already can access the information of the credit card 90.

Continuing with FIGS. 1A and 1B, at operation 180, the merchant server 107 sends the PAN of the credit card 90 and other transaction data (e.g., amount for the transaction, merchant information) to a 3DS server 109. The 3DS server 109, the directory server 110, and the ACS 111 are part of the authentication network 119 (as shown in FIG. 2). The authentication network 119 is also called the 3DS network.

The 3DS server 109 transmits an authentication request at operation 182 that includes a payload to the directory server 110. The payload includes at least the PAN, the merchant identifier (e.g., merchant name), and an amount of the transaction. After receiving the authentication request at operation 182, the directory server 110 transmits its authentication request at operation 184, which includes the same payload. In some cases, the directory server will verify and digitally sign the payload, and transmit the digitally signed payload in the authentication request.

The ACS 111 receives the authentication request from operation 184, which includes the payload. The ACS 111 uses the PAN to identify the corresponding alias 10. In some cases, other data corresponding to the PAN is identified, such as the signing public key 120b, the enrollment state 21, the wallet ID 22, or the availability that the device-bound digital wallet authentication is available for the PAN, or a combination thereof.

In some cases, after the ACS 111 receives the authentication request, the ACS 111 determines if a challenge request is required for this transaction. In some cases, the ACS 111 determines if there is a need to sign the transaction. In some cases, the ACS 111 makes this determination by accessing and a risk profile associated with the transaction to determine if a challenge request is required. If required, the ACS 111 sends the challenge request to the DCN server 123 at operation 186a.

In some cases, the DCN server 123 uses the alias 10, or PAN and/or card information 9, or a combination thereof, to identify the related notification token 12. The DCN server 123 uses the notification token 12 to send a push notification to the user device (operation 186b), and the push notification includes an indication there is a challenge for the transaction. The user device 100 receives the push notification, which include data about the challenge, also called challenge data. In some cases, the challenge data includes merchant information, amount or cost associated with the transaction, the alias 10, or the credit card information, or a combination thereof. The user sees the push notification displayed on the user device 100 and confirms this information (e.g., via a user interface of the user device 100). For example, the user confirms the merchant information, cost, credit card information are correct and input a confirmation selection on a user interface of the digital wallet 115. This confirmation selection, or another type of user action, invokes the digital wallet 115 to digitally sign the challenge data using biometric ID (e.g., face ID/touch ID), as per operation 187. The user device 100 uses the signing private key 120*a* to digitally sign the challenge data after a successful user authentication (e.g., biometric authentication). For example, the device biometric ID 121 is verified using a scanner 106 (see FIG. 2). In some cases, the result is digitally signed challenge data, which is returned back to the DCN server 123 (operation 188*a*). The DCN server 123 verifies the digital signature using the signing public key 120*b* (operation 188*b*). The DCN server 123 returns the verification result and/or the digitally signed challenge data to the ACS (operation 188*c*).

In some cases, the push notification is an in-app notification (e.g., displayable as a pop-up or other notification) via the digital wallet 115.

In some cases, in alternative to using a biometric authentication process, the user device 100 prompts an action to be taken by the user, such as inputting a passcode. In an example aspect, Fast Identity Online (FIDO) protocols using biometric authentication are executed by the user device 100 and the access control server to provide user authentication of a transaction. In some cases, the signing private key 120*a* and the signing public key 120*b* are a FIDO key pair, and the digital signature for the digitally signed challenge is a FIDO signature. In another example aspect, WebAuthn is used to implement the transaction authentication.

In some cases, there are multiple devices, each with their own digital wallets and each associated with their own notification tokens. The multiple notification tokens are bound to one alias 10, and in turn is bound to one PAN and/or credit card information 9. In such a case, push notifications could be sent to multiple devices using the multiple notification tokens. In such a case, if the user selects or interacts with a given one of the push notifications on a given user device (from amongst the multiple devices), then the other push notifications become invalid.

At operation 190, the ACS 111 then generates an online authentication process response message. The online authentication process response message may include a cardholder authentication verification value (CAVV) and an electronic commerce indicator (ECI). In an example aspect, the ECI is associated with an e-commerce transaction and it represents a value determined by the ACS 111. In cases where the transaction is successfully verified or attempted, then the ACS 111 provides the ECI to the 3DS server 109. The ACS 111 transmits the online authentication process response message to the directory server 110. The "online authentication process response message" is also herein called "an authentication response message".

At operation 192, the directory server 110 transmits an authentication response message to the 3DS server 109. At operation 194, the 3DS server 109 transmits an authentication response message to the merchant server 107.

In some cases, the authentication response messages transmitted at operations 190, 192, 194 include the CAVV or ECI, or both.

After receiving merchant server receives the authentication response message 194, it submits the CAVV, PAN, amount, etc. to the payment processing network for settlement.

In some cases, the functionality and data components of the DCN server 123 and the ACS 111 are combined into a combined server. In some cases, the combined server is also be called an access control server.

Turning to FIG. 2, the computing architecture includes one or more users (e.g., user 1, user 2) and their user devices 100. Examples of user devices include mobile devices, laptops, desktop computers, tablets, smart phones, etc. A user device has a processor, memory, a communication module (e.g., for communicating via a cell network, WiFi, LAN, WAN, etc.), and a user interface (e.g., display screen, touch interface, keyboard, mouse, etc.), collectively referenced as 102. In an example aspect, the user device 100 includes a browser 103*a*, or a native application (also called an app) 103*b*, or both. The browser or the native app, or both, are more generally herein referred to as the user agent 103. The digital wallet, or wallet app, 115 is stored on the user device 100.

The user device also has a hardware-backed device authenticator 105, which is used to store user-identifying data on the device a secure manner and to authenticate the user. The user device may also include a scanner 106, such as a camera, a thumbprint scanner, a heartrate monitor, a microphone for voice detection, etc. In an example aspect, the hardware-backed device authenticator 105 includes a secure execution and secure storage environment, which can be implemented using one or more of: a Trusted Execution Environment (TEE); a secure element, a firewall; a software layer; a secure enclave; a Hardware Secure Module (HSM); etc. It will be appreciated that a TEE is a computing chip that, for example, exists on a processor device. It will be appreciated that a HSM is a separated computing appliance. Authentication data about a user can be stored in the hardware-backed device authenticator. The authentication data about the user, for example, includes a device authentication private key (also referred to as the signing private key 120*a*) associated with the user and the device authenticator 105 of the device 100. In an example aspect of using a FIDO protocol, the signing private key 120*a* is known as a FIDO private key.

In some cases, the hardware-backed device authenticator 105 may also store other data, including, but not limited to: biometric authentication data, passwords, security codes, name, address, account numbers (e.g., like a primary account number (PAN), driver's license number, etc.), age, date of birth, citizenship, or credentials, or a combination thereof.

In some cases, the hardware-backed device authenticator 105 interacts with a scanner 106 to obtain identifying data about the user, and compares the scanned identifying data about the user with stored identifying data about the user. For example, the identifying data about the user is biometric authentication data, including and not limited to one or more of: fingerprint scan, eye scan, facial recognition, voice recognition, heartbeat or pulse monitoring, DNA sampling, body temperature, etc. The scanner 106 includes one or more sensors that can capture the biometric authentication data. Examples of scanners include a rear camera 106*a*, a front camera 106b, an RFID scanner 106c, a thumbprint scanner 106d, and a light detection and ranging (LIDAR) scanner 106e.

In other words, the device authenticator stores first biometric authentication data, such as during a setup process. To verify a transaction, the scanner is used to obtain the user input verification, which comprises second biometric authentication data. The device authenticator compares the second biometric authentication data with the first biometric data, which is already stored on the device authenticator. A successful match of the data leads to the device authenticator verifying transaction data.

In some example embodiments, the processes described herein use a scanner 106. In other example embodiments, the processes described herein do not use a scanner 106, and the identifying data about the user is submitted through other interfaces. It will also be appreciated that the identifying information about the user can data that is not biometric in nature.

In an example embodiment, the device authenticator 105 and the scanner are built into the user device 100.

In another example embodiment, the device authenticator 105 and the scanner 106 are part of an external authenticator device 100'. The user device 100 and the external authenticator device 100' are in data communication with each other. For example, the external authenticator device 100' is connected to the user device 100 via a wire or some other electrical connection (e.g., universal serial bus (USB)). In another example, the external authenticator device 100' is connected to the user device 100 via wireless communication. Examples of wireless communication include the Bluetooth, Near Field Communication, and WiFi. Example embodiments of an external authenticator device 100' include a smart watch, a USB key, a dongle, and a smart phone.

The user device 100, in some cases, also includes a NFC module 124 to, for example, facilitate contactless payments using the digital wallet 115.

Figure 3:
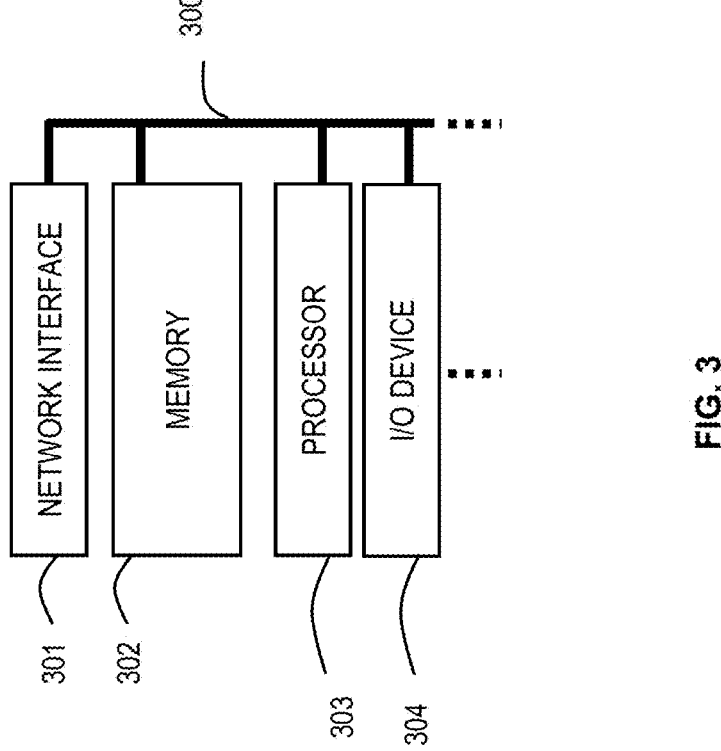
FIG. 3 is a schematic diagram of components of a server, according to another example embodiment.

The one or more user devices 100 are in data communication with a data network 130. The system also includes other servers 107, 123, 121, 109, 110, 111 and 112, which are also in data communication with the data network 130. A "server" herein refers to a computing system that can include one server computer or multiple server computers that are networked to operate together. In some cases, the server includes one or more processing nodes in a cloud computing environment. As shown in FIG. 3, a server includes a network interface 301, memory 302, one or more processors 303, memory, and, in some cases, an input/output device 304. These components are in data communication together, for example, using a data bus 300. A server also includes software and other logic modules for storing data and executing instructions.

The merchant server 107 is operates an interface for conducting operations with the user device 100. For example, the merchant server 107 is a relying party that relies on the data verification and user authentication provided by the other servers. The merchant server, for example, is a merchant or some other party that wishes to process a transaction with the user. The merchant server 107, for example, has a website on which the user wishes to execute a transaction. In some embodiments, the service provider server provides a physical good, digital good, or service in return for a successful transaction with the user. In other cases, a transaction can be provided without an exchange (e.g., for donations, for giveaways, etc.).

The 3DS server 109 is an intermediary party between external parties that wish to contact the directory server 110 and access control server 111. These servers form the payment processing network 119, also called the 3DS network or an authentication network. The 3DS server 109 includes a merchant plugin (MPI). In another example, the 3DS server 109 is a processing network of computers that provide authorization services, and clearing and settlement services for transactions. A processing network of computers may include data processing subsystems, networks, and operations used to support and deliver authorization services, exception file services, and clearing and settlement services. An example of a payment processing network, which can interact directly or indirectly with an authentication network, is available under the tradename VisaNet™. Payment processing networks such as VisaNet™ are able to process credit card transactions, debit card transactions, and other types of commercial transactions.

A directory server 110 includes a directory (e.g., a look-up a database) of access control servers and accordingly routes messages in a transaction system. In an example embodiment, the messages routed by the directory server 110 may include enrollment and authentication information between a merchant plugin and an issuer access control server. The directory server 110 can also determine whether an account can utilize the authentication services. In some cases, the directory server 110 can be operated by a transaction service provider. In some cases, the directory server 110 may also tokenize account data or may de-tokenize tokens.

In some cases, an ACS 111 executes verification processes to verify a transaction for a user or service provider wanting to make an online transaction. In some cases, the ACS 111 performs requested authentication services for issuers or other entities, and provide digitally signed responses to entities requesting authentication. The ACS 111 may be shared or used by multiple entities.

An Authentication Alliance Server (AAS) 112 is a signing service that stores public keys for entities. In other words, it stores the public key of a trusted entity, and signs it using the AAS private key. The corresponding AAS public key is available to entities, such as the access control server and the directory server. In an example aspect, the AAS 112 is a Fast Identity Online (FIDO) Alliance Server that stores public keys of certified entities.

It will be appreciated that there may be multiple instances of each of servers. For example, different instances of a server store different data, or are located in different geographical regions, or both.

Referring to FIG. 4, an example process 400 is executed by a DCN server 123 (also called a DCN server system) for a process for registration. The executable operations are below.

Block 402: The DCN server receives a notification token, a PAN, an alias, and a signing public key in association with each other, wherein the notification token is a unique ID of a digital wallet of a user device, wherein the alias is linked to the PAN that is associated with a digital credit card stored in the digital wallet, and wherein the signing public key corresponds to a signing private key generated by the user device in association with the digital wallet.

Block 404: The DCN server transmits a request, which is receivable by an access control server, to invoke a registration at the access control server of at least the PAN and the alias authenticating the digital wallet.

Block 406: The DCN server, responsive to the request, receives a confirmation, which is transmittable by the access control server, indicating that the registration is complete.

Block 408: The DCN server, after receiving the confirmation, deletes the PAN from the memory, and persistently stores in a database, in the memory, the notification token, the alias, and the signing public key in association with each other.

Referring to FIG. 5, an example process 500 is executed by a DCN server 123 (also called a DCN server system) for a process for registration and a device-bound digital wallet authentication. The executable operations are below.

Block 502: The DCN server executes a process for registration that comprises persistently storing a notification token, an alias, and a signing public key in association with each other, wherein the notification token is a unique ID of a digital wallet of a user device, wherein the alias is linked to the PAN that is associated with a digital credit card stored in the digital wallet, and wherein the signing public key corresponds to a signing private key generated by the user device in association with the digital wallet.

Block 504: The DCN server executes a device-bound digital wallet authentication comprising some or all of the operations in blocks 506 to 516.

Block 506: The DCN server receives a challenge request, which is transmittable by an access control server, and wherein the challenge request comprises the alias.

Block 508: The DCN server identifies the notification token related to the alias.

Block 510: The DCN server generates and sends a push notification using the notification token, the push notification receivable by the digital wallet on the user device, and wherein the push notification includes challenge data obtained from the challenge request.

Block 512: After sending the push notification, the DCN server receives a digitally signed challenge data comprising at least a digital signature, and wherein the digital signature is signed by the user device using the signing private key.

Block 514: The DCN server verifies the digital signature using the signing public key.

Block 516: The DCN server transmits a verification result based on the verifying, the verification result receivable by the access control server.

Referring to FIGS. 6A and 6B, an example process is executed by a DCN server 123 (also called a DCN server system) and a user device 100 for a process for registration (process 600a) and a device-bound digital wallet authentication (process 600b). The executable operations are below.

In FIG. 6A, (at process 600b) after a process for registration between at least the user device and the DCN server, the following data is stored according to some embodiments.

Block 602: The user device persistently stores in the digital wallet at least a network-device token, an alias, and a notification token; wherein the notification token is a unique ID of the digital wallet that is bound to the user device, wherein the alias is linked to a PAN that is associated with the digital credit card stored in the digital wallet.

Block 604: The hardware-backed device authenticator of the user device stores a signing public key and a signing private key in association with the digital wallet and the alias.

Block 606: The DCN server persistently stores the notification token, the alias, and the signing public key in association with each other.

At process 600b in FIG. 6B, the user device and the DCN server are configured to execute a device-bound digital wallet authentication that includes the below executable operations, according to some embodiments.

Block 610: The DCN server receives a challenge request, which is transmittable by an access control server, and wherein the challenge request comprises the alias.

Block 612: The DCN server identifies the notification token related to the alias.

Block 614: The DCN server generates and sends a push notification, using the notification token, to the digital wallet on the user device, and wherein the push notification includes challenge data obtained from the challenge request.

Block 616: The user device displays the push notification.

Block 618: The user device receives a user input to invoke using the digital wallet to digitally sign the challenge data.

Block 620: The user device initiates the scanner for biometric authentication and, after the biometric authentication, uses the signing private key to generate a digitally signed challenge data comprising at least a digital signature.

Block 622: The user device sends the digitally signed challenge data to the DCN server.

Block 624: The DCN server verifies the digital signature using the signing public key.

Block 626: The DCN server transmits a verification result based on the verifying, the verification result receivable by the access control server.

Various apparatuses (including devices and servers) or processes have been described to provide examples of embodiments of the claimed subject matter. No such example embodiment described limits any claim and any claim may cover processes or apparatuses that differ from those described. The claims are not limited to apparatuses or processes having all the features of any one apparatus or process described above or to features common to multiple or all the apparatuses or processes described above. It is possible that an apparatus or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix. All elements with a common base number may be referred to collectively or generically using the base number without a suffix (e.g., 112).

The systems, methods, and apparatuses described herein may be implemented as a combination of hardware or software. In some cases, the systems, methods, and apparatus described herein may be implemented, at least in part, by using one or more computer programs, executing on one or more programmable devices including at least one processing element, and a data storage element (including volatile and non-volatile memory and/or storage elements). These apparatuses may also have at least one input device (e.g., a pushbutton keyboard, mouse, a touchscreen, and the like), and at least one output device (e.g. a display screen, a printer, a wireless radio, and the like) depending on the nature of the device. Further, in some examples, one or more of the systems, methods and apparatus, including the platform server and the integration server, described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the processing systems, which can include central processing units (CPUs), the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems, apparatus and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or apparatuses, it will be appreciated that other processes or apparatuses may be within the scope of the accompanying claims.

What is claimed is:

1. A data coordination and notification server system, comprising:

a memory, a network interface, and a processor operatively coupled to the memory and the network interface;

the processor configured to execute a process for registration comprising:

receiving a notification token, a primary account number (PAN), an alias, and a signing public key in association with each other, wherein the notification token is a unique ID of a digital wallet of a user device, wherein the alias is linked to the PAN that is associated with a digital credit card stored in the digital wallet, and wherein the signing public key corresponds to a signing private key generated by the user device in association with the digital wallet;

transmitting a request, which is receivable by an access control server, to invoke a registration at the access control server of at least the PAN and the alias authenticating the digital wallet;

responsive to the request, receiving a confirmation, which is transmittable by the access control server, indicating that the registration is complete; and after receiving the confirmation, deleting the PAN from the memory, and persistently store in a database the notification token, the alias, and the signing public key in association with each other;

after the process for registration, execute a device-bound digital wallet authentication comprising:

receiving a challenge request, which is transmittable by the access control server, and wherein the challenge request comprises the alias;

identifying the notification token related to the alias; and generating and sending a push notification using the notification token, the push notification receivable by the digital wallet on the user device, and wherein the push notification includes challenge data obtained from the challenge request;

after sending the push notification, receiving a digitally signed challenge data comprising at least a digital signature, and wherein the digital signature is signed by the user device using the signing private key:

verifying the digital signature using the signing public key; and transmitting a verification result based on the verifying, the verification result receivable by the access control server.

2. The data coordination and notification server system of claim 1, wherein the data coordination and notification server system is in data communication with the user device, and the notification token, the PAN, the alias, and the signing public key are sent by the user device.

3. The data coordination and notification server system of claim 1, further persistently storing in the database one or more Access Control Server (ACS) handlers in association with at least the alias and the notification token, and wherein the one or more ACS handlers each comprises information that facilitates communication between the data coordination and notification server system and the access control server.

4. The data coordination and notification server system of claim 1, further persistently storing in the database user device information about the user device in association with at least the alias and the notification token, and wherein the user device information comprises: a device build/model, or an operating system (OS) version, or a device name, or a combination thereof.

5. The data coordination and notification server system of claim 1, further persistently storing in the database a wallet ID in association with at least the alias and the notification token, wherein the wallet ID uniquely identifies the digital wallet.

6. The data coordination and notification server system of claim 1, further persistently storing in the database an enrollment state in association with at least the alias and the notification token, wherein the enrollment state is a state identifying whether or not the digital credit card is enrolled with the data coordination and notification server system.

7. The data coordination and notification server system of claim 1, further persistently storing in the database a state machine, which tracks and stores a plurality of states of a plurality of digital wallets in a plurality of user devices, and which ones of a plurality of digital credit cards are stored in or associated with which ones of the plurality of digital wallets; and, at least one state in the state machine is associated with the notification token, the alias, and the signing public key.

8. The data coordination and notification server system of claim 1, wherein the alias alone cannot be used to compute the network-device token nor the PAN.

9. The data coordination and notification server system of claim 1, wherein the alias is a payment account reference (PAR) or a PanRefID, or a TokenRefID.

10. The data coordination and notification server system of claim 1, wherein the push notification invokes a pop-up notification in the user device.

11. A data coordination and notification server system, comprising:

a memory, a network interface, and a processor operatively coupled to the memory and the network interface;

the processor configured to execute a process for registration that comprises persistently storing a notification token, an alias, and a signing public key in association with each other, wherein the notification token is a unique ID of a digital wallet of a user device, wherein the alias is linked to the PAN that is associated with a digital credit card stored in the digital wallet, and wherein the signing public key corresponds to a signing private key generated by the user device in association with the digital wallet; and the processor further configured to execute a device-bound digital wallet authentication comprising:

receiving a challenge request, which is transmittable by an access control server, and wherein the challenge request comprises the alias;

identifying the notification token related to the alias; and generating and sending a push notification using the notification token, the push notification receivable by the digital wallet on the user device, and wherein the push notification includes challenge data obtained from the challenge request;

after sending the push notification, receiving a digitally signed challenge data comprising at least a digital signature, and wherein the digital signature is signed by the user device using the signing private key;

verifying the digital signature using the signing public key; and transmitting a verification result based on the verifying, the verification result receivable by the access control server.

12. The data coordination and notification server system of claim 11, wherein the push notification invokes a pop-up notification in the user device.

13. The data coordination and notification server system of claim 11, wherein the process for registration further comprises persistently storing one or more Access Control Server (ACS) handlers in association with at least the alias and the notification token, and wherein the one or more ACS handlers each comprises information that facilitates communication between the data coordination and notification server system and the access control server.

14. The data coordination and notification server system of claim 11, wherein the process for registration further comprises persistently storing user device information about the user device in association with at least the alias and the notification token, and wherein the user device information comprises: a device build/model, or an operating system (OS) version, or a device name, or a combination thereof.

15. The data coordination and notification server system of claim 11, wherein the process for registration further comprises persistently storing an enrollment state in association with at least the alias and the notification token, wherein the enrollment state is a state identifying whether or not the digital credit card is enrolled with the data coordination and notification server system.

16. The data coordination and notification server system of claim 11, wherein the process for registration further comprises persistently storing a state machine, which tracks and stores a plurality of states of a plurality of digital wallets in a plurality of user devices, and which ones of a plurality of digital credit cards are stored in or associated with which ones of the plurality of digital wallets; and, at least one state in the state machine is associated with the notification token, the alias, and the signing public key.

17. A system for device-bound digital wallet authentication, comprising:

a user device and a digital coordination and notification (DCN) server;

the user device comprising a hardware-backed device authenticator, a scanner, and a memory storing thereon a digital wallet;

wherein, after a process for registration between at least the user device and the DCN server:

the user device persistently stores in the digital wallet at least a network-device token, an alias, and a notification token; wherein the notification token is a unique ID of the digital wallet that is bound to the user device, wherein the alias is linked to a primary account number (PAN) that is associated with the digital credit card stored in the digital wallet;

the hardware-backed device authenticator stores a signing public key and a signing private key in association with the digital wallet and the alias;

the DCN server persistently stores the notification token, the alias, and the signing public key in association with each other;

wherein the user device and the DCN server are configured to execute a device-bound digital wallet authentication comprising:

the DCN server receiving a challenge request, which is transmittable by an access control server, and wherein the challenge request comprises the alias;

the DCN server identifying the notification token related to the alias;

the DCN server generating and sending a push notification, using the notification token, to the digital wallet on the user device, and wherein the push notification includes challenge data obtained from the challenge request;

the user device displaying the push notification;

the user device receiving a user input to invoke using the digital wallet to digitally sign the challenge data;

the user device initiating the scanner for biometric authentication and, after the biometric authentication, using the signing private key to generate a digitally signed challenge data comprising a digital signature;

the user device sending the digitally signed challenge data to the DCN server;

the DCN server verifying the digital signature using the signing public key; and the DCN server transmitting a verification result based on the verifying, the verification result receivable by the access control server.

* * * * *